Feb. 5, 1957   W. D. LUDWIG   2,780,755
SOLENOID DESIGN
Filed July 29, 1953   2 Sheets-Sheet 1
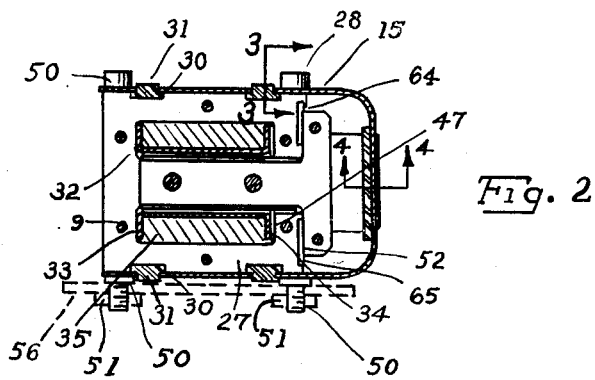
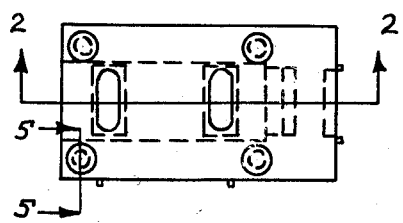
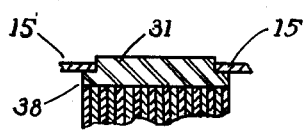
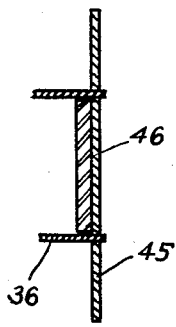
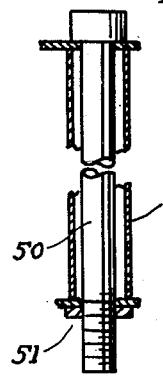
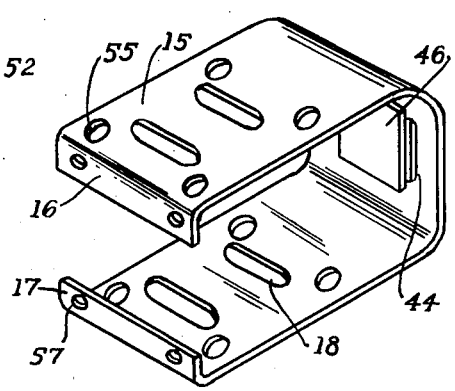
INVENTOR.
Walter D Ludwig
BY Thos. S. Donnelly
attorney

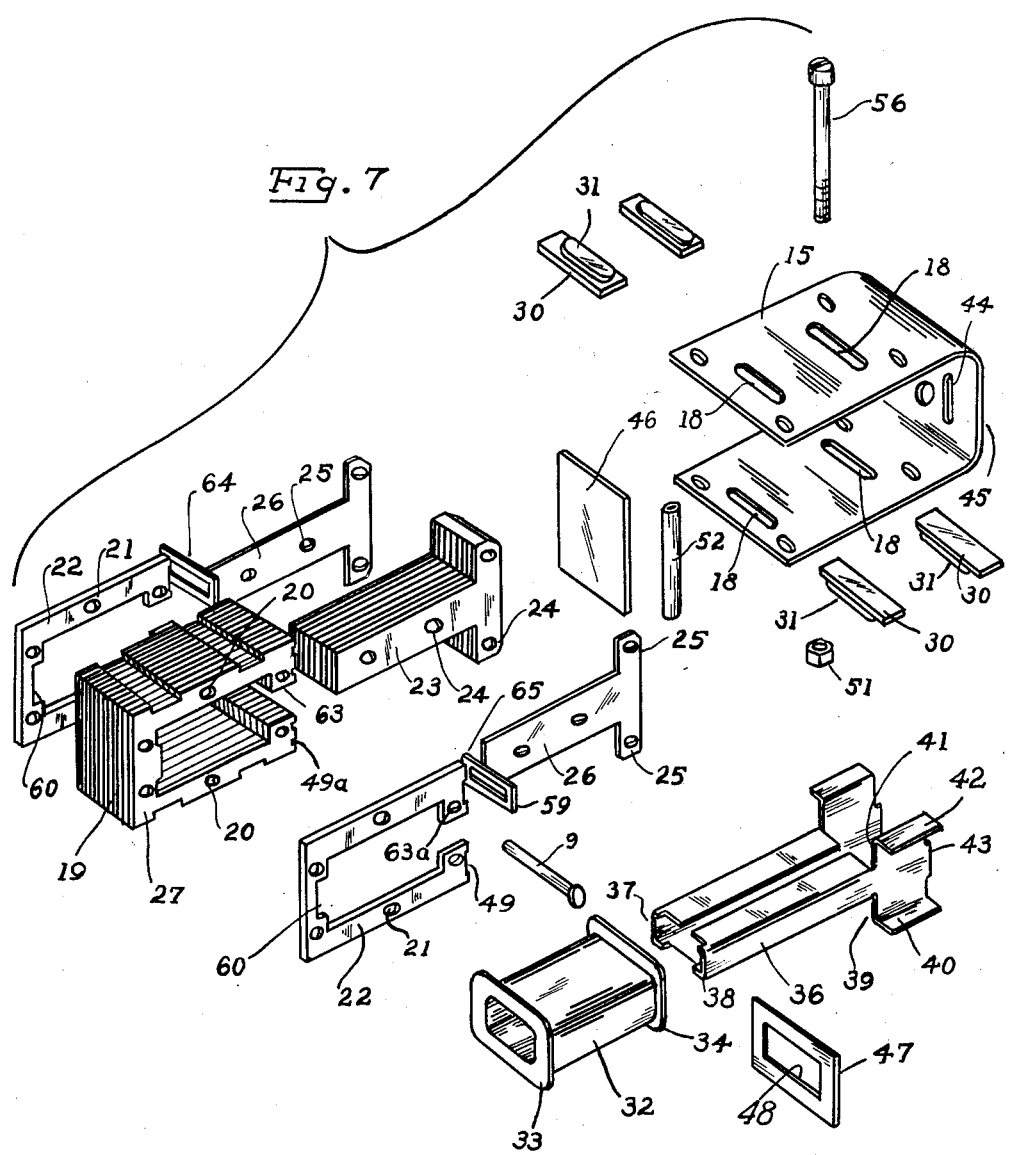

United States Patent Office 2,780,755
Patented Feb. 5, 1957

2,780,755
SOLENOID DESIGN

Walter D. Ludwig, Royal Oak, Mich.

Application July 29, 1953, Serial No. 371,135

10 Claims. (Cl. 317—191)

My invention relates to a new and useful improvement in a solenoid, in which a reciprocal core is used. The solenoid is usually mounted on a bracket fixed to a suitable support.

It is an object of the present invention to provide a solenoid so constructed and arranged and associated with the supporting bracket that vibrations resulting from the operation of the solenoid will not be transmitted to the supporting bracket with the result that the life of the bracket and component parts may be prolonged.

Another object of the invention is the provision in a solenoid of this class of shading coils mounted on the C-frame in such a manner that relative movement of the laminations of the C-frame will not affect or disturb the mounting of the shading coils on the C-frame.

Another object of the invention is the provision of a solenoid and supporting bracket so arranged and constructed that the removal of securing members from the supporting bracket will permit the various parts of the solenoid to be separated and removed so that they may be easily and quickly replaced with new parts.

Other objects will appear hereinafter.

It is recognized that various modifications and changes may be made in the detail of structure illustrated without departing from the invention and it is intended that the present disclosures shall be considered to be but the preferred embodiment.

Forming a part of this application are drawings in which,

Fig. 1 is a plan view of the invention.

Fig. 2 is a sectional view taken on line 2—2 of Fig. 1.

Fig. 3 is a fragmentary sectional view taken on line 3—3 of Fig. 2 slightly enlarged.

Fig. 4 is a slightly enlarged fragmentary view taken on line 4—4 of Fig. 2.

Fig. 5 is a fragmentary enlarged sectional view with parts broken away taken on line 5—5 of Fig. 1.

Fig. 6 is a perspective view of the frame mounting bracket.

Fig. 7 is an exploded view showing the various parts of the invention.

As shown in the drawings, a supporting bracket generally designated by the numeral 15 is formed from a U-shaped structure. The form of the bracket shown in Fig. 6 differs from the form of the bracket shown in Fig. 7 in that in Fig. 6 there is an inwardly projecting flange 16 and 17 on each of the opposing legs of the U-shaped structure.

The bracket is provided with a plurality of slots 18 formed in each of the legs. The C-frame is formed from a plurality of metallic laminations 19. These laminations are each provided with the openings 20 through which may be projected suitable rivets 9 for securing the C-frame together. At each side of the laminations there is mounted a side plate 22 also provided with openings 21 matching with the openings 20 and through which the rivets 49 are also projected so that the side plates are secured fixedly to the C-frame on the opposite sides thereof.

Each of the laminaions 19 from which the C-frame is made is provided with spaced apart recesses 28 and 29 which are adapted to align with the slots 18. Flexible pads, formed preferably from rubber or other suitable materials, are used, each having a planar portion 30 and a ribbed portion 31, the ribbed portion 31 projecting through the slot 18 from the inner face of the legs of the U-shaped bracket and the planar portion 30 lying in the recesses 28 and 29. When the structure is assembled, as shown in Fig. 1, these rubber pads are not utilized as compression dampeners but are positioned under shear with regard to the applied shock load. Consequently, a relative movement of the C-frame to the supporting bracket, during the operation of the solenoid, will cause a relative shear flexing between portions 30 and 31 of these pads so that a maximum benefit is obtained from the shock absorbing medium.

Positioned in the C-frame is a coil form 32 having an outwardly projecting flange 33 at one end and a similar outwardly projecting flange 34 at the opposite end. The windings 35 are mounted on the coil form 32.

Projecting through the coil form is an open channel-shaped guide 36 having outwardly projecting tongues 37 and 38 at one end. These tongues engage in the recesses 60 formed in the side plates 22 so that the end of the guide 36 will embrace the bosses 62 formed on the inner edge of the bight of the laminations 19. The guide 36 is provided at its opposite end with a downwardly extending plate 39 having an angularly turned flange 40 and provided with the upwardly extending plate 41 having the angularly turned flange 42. Tongues 43 project outwardly from the end of the guide, each of these tongues engaging in a slot 44 formed in the bight 45 of the U-shaped bracket. Mounted on the inner face of the bight 45 is a rubber pad 46, the tongues 43 extending at opposite sides of the pad 46.

Embracing the guide 36 is a rubber plate 47 having an opening 48 formed therethrough for reception of the guide 36. This plate 47 serves to space the coil form 32, at one of its ends, from the inturned ends 63 of the laminations of the C-frame and also from the inturned ends 63–a of the side plates 22. The opposite end of the coil form 32 will seat over the bosses 62.

When the solenoid is mounted in the supporting bracket as shown in Fig. 2, spacing sleeves 52 are positioned between the legs of the supporting bracket in alignment with the openings 55. Projected through these openings 55 and through the spacing sleeves 52 are bolts 50. The spacing sleeves are of such length that the space between the legs of the U-shaped supporting bracket is greater than the C-frame height and cannot approach each other sufficiently to place the rubber pads embodying the portions 30 and 31 under compression. The threaded ends of the bolts 50 are adapted to be threaded into the supporting body 56 or extend therethrough to receive a nut 51 so that the bracket is thus fixedly mounted on a suitable supporting body.

In the form of bracket shown in Fig. 6, securing means are projected through the openings 57 formed in the flanges 16 and 17 which serve to mount the bracket on a suitable support. This type of bracket is used where the solenoid assembly is to be mounted on its end to the support; whereas the type of bracket shown in Fig. 7 is used where the bracket is to be mounted on its side of the support.

Formed in the ends of the side plates 22 is a recess 49 and a similar recess 49–a is formed in the end of each of the laminations. Positioned in these recesses 49 and 49–a is a pair of shading coils or copper loops 64 and 65. These shading coils are rubber vulcanized in the recesses 49 and 49–a. A common form of construction is to braze the shading coils to the end edges of the C-frame laminations. In the use of the solenoid there usually occurs a slightly relative movement of the laminations to each other which, when the shading coils are brazed thereto, forms a distortion, a loosening and a breaking of the attachment of the shading coils to the laminations. In the present invention the shading coils 64 and 65 are rubber vulcanized in the recesses 49 and 49–a. This rubber mounting of these shading coils in position permits relative movement of the side plates of the C-frame and relative movement of the laminations without loosening or destroying the mounting of the shading coils in position.

Due to the mounting of the solenoid in the bracket the vibrations arising in the solenoid during its operation are not transmitted to the bracket. The solenoid is held fixed in the bracket while at the same time a quasi floating mounting is provided. Another result from mounting the solenoid in the bracket in this manner is that the screws and nuts securing the supporting bracket to the supporting plate do not vibrate loose and a firm mounting is always assured. In use when the core moves to the left of the Fig. 2, it will strike the C-frame and the C-frame will move in response to such a blow within the limits of flexing the portions 31 of the rubber pads. In addition to eliminating transmission of vibrations, a silencing of noises which would otherwise occur is effected.

When the supporting bracket is formed from magnetic material, such as cold rolled steel, the rubber pad 46 between the end of the core 23 and the bight of the supporting bracket serves as a non-magnetic spacer. This rubber pad 46 also serves as a shock absorber as the core moves into contact therewith.

It is believed obvious that by removing the bolts 50 the entire solenoid may be removed from the bracket and the solenoid easily and quickly taken apart for removal and replacement of worn parts.

What I claim is:

1. In combination a solenoid embodying a frame having recesses formed in its outer sides; a supporting bracket embracing said sides and having openings formed therein registering with said recesses; a flexible pad positioned in said recesses and having a portion projecting through said openings; spacing sleeves extending from one of said sides to the other for retaining the embracing portions of said bracket spaced apart sufficiently to clear the frame and prevent a compression of said pads; and mounting bolts extending through said bracket and said sleeves.

2. In a solenoid, a C-frame having recesses formed in opposite sides; a U-shaped supporting bracket embracing at its legs said opposite sides; flexible pads seated in said recesses and interengaging with the legs of said bracket to locate the frame sidewise and limit movement of said C-frame longitudinally of said legs.

3. In a solenoid, a C-frame having recesses formed in opposite sides; a U-shaped supporting bracket embracing at its legs said opposite sides; flexible pads seated in said recesses and interengaging with the legs of said bracket to locate the frame sidewise and limit movement of said C-frame longitudinally of said legs; and spacing members between said legs for maintaining the same spaced apart a sufficient distance for preventing compression of said flexible members.

4. In a solenoid, a C-frame having recesses formed in opposite sides; a U-shaped supporting bracket embracing at its legs said opposite sides; flexible pads seated in said recesses and interengaging with the legs of said bracket to locate the frame sidewise and limit movement of said C-frame longitudinally of said legs; spacing members between said legs for maintaining the same spaced apart a sufficient distance for preventing compression of said flexible members; and securing bolts extending through said sleeves for providing means for mounting said bracket on a support.

5. In a solenoid, a C-frame having recesses formed in opposite sides; a U-shaped supporting bracket embracing at its legs said opposite sides; flexible pads seated in said recesses and interengaging with the legs of said bracket to locate the frame sidewise and limit movement of said C-frame longitudinally of said legs; spacing members between said legs for maintaining the same spaced apart a sufficient distance for preventing compression of said flexible members; securing bolts extending through said sleeves for providing means for mounting said bracket on a support; a coil form positioned in said C-frame windings of said coil form; and a flexible member engaging one end of said coil form and spacing the same from one end of said frame.

6. In a solenoid of the class described, a C-frame having recesses formed in its opposite sides; a U-shaped supporting bracket embracing with its legs said frame and having openings formed therein registering with the recesses in said frame, said recesses being wider than said openings; a rubber pad seated in each of said recesses and snugly filling the same; a rib projecting upwardly from the face of said pads, narrower than said pads and projecting into the openings in said legs; and securing means projected through said legs for retaining same in relation to said C-frame.

7. In a solenoid of the class described, a C-frame having recesses formed in its opposite sides; a U-shaped supporting bracket embracing with its legs said frame and having openings formed therein registering with the recesses in said frame, said recesses being wider than said openings; a rubber pad seated in each of said recesses and snugly filling the same; a rib projecting upwardly from the face of said pads, narrower than said pads and projecting into the openings in said legs; securing means projected through said legs for retaining same in relation to said C-frame; and spacing members positioned between said legs for preventing relative approach of the same sufficiently for placing said pads under compression.

8. In a solenoid of the class described, a C-frame; a pair of side plates each mounted on one side of said frame and having a recess formed therein; a core guide projected into said frame; a pair of spaced apart tongues on said guide each engaging in a recess in a side plate; a U-shaped supporting bracket embracing with its legs said C-frame and having in its bight a pair of spaced apart slots; and a pair of spaced apart tongues on said guide each engaging in a slot in said bight.

9. In a solenoid of the class described, a C-frame; a pair of side plates each mounted on one side of said frame and having a recess formed therein; a core guide projected into said frame; a pair of spaced apart tongues on said guide each engaging in a recess in a side plate; a U-shaped supporting bracket embracing with its legs said C-frame and having in its bight a pair of spaced apart slots; a pair of spaced apart tongues on said guide each engaging in a slot in said bight; and a rubber plate engaging the inner face of said bight and lying between the slots in said bight.

10. In a solenoid of the class described, a C-frame; a pair of side plates each mounted on one side of said frame and having a recess formed therein; a core guide projected into said frame; a pair of spaced apart tongues on said guide each engaging in a recess in a side plate; a U-shaped supporting bracket embracing with its legs said C-frame and having in its bight a pair of spaced apart slots; a pair of spaced apart tongues on said guide each engaging in a slot in said bight; a rubber plate engaging the inner face of said bight and lying between the slots in said bight; and a core slidable in said C-frame and said guide and engageable, upon movement in one direction, with said plate.

References Cited in the file of this patent

UNITED STATES PATENTS

| | | |
|---|---|---|
| 1,523,423 | Hoge | Jan. 20, 1925 |
| 1,804,961 | Thomas | May 12, 1931 |
| 1,823,979 | Jordan | Sept. 22, 1931 |
| 2,516,603 | Soreng | July 25, 1950 |
| 2,565,697 | Obstrcil | Aug. 28, 1951 |
| 2,610,233 | Caldwell | Sept. 9, 1952 |